(12) United States Patent
Aktas et al.

(10) Patent No.: US 9,438,620 B2
(45) Date of Patent: Sep. 6, 2016

(54) CONTROL FLOW GRAPH REPRESENTATION AND CLASSIFICATION

(71) Applicant: McAfee, Inc., Santa Clara, CA (US)

(72) Inventors: Erdem Aktas, Beaverton, OR (US); Rachit Mathur, Hillsboro, OR (US)

(73) Assignee: McAfee, Inc., Santa Clara, CA (US)

( * ) Notice: Subject to any disclaimer, the term of this patent is extended or adjusted under 35 U.S.C. 154(b) by 175 days.

(21) Appl. No.: 14/126,872

(22) PCT Filed: Oct. 22, 2013

(86) PCT No.: PCT/US2013/066241
§ 371 (c)(1),
(2) Date: Dec. 17, 2013

(87) PCT Pub. No.: WO2015/060832
PCT Pub. Date: Apr. 30, 2015

(65) Prior Publication Data
US 2015/0180883 A1 Jun. 25, 2015

(51) Int. Cl.
G06F 3/00 (2006.01)
H04L 29/06 (2006.01)
G06F 17/30 (2006.01)
G06F 9/46 (2006.01)

(52) U.S. Cl.
CPC ............... *H04L 63/145* (2013.01); *G06F 9/46* (2013.01); *G06F 17/30601* (2013.01)

(58) Field of Classification Search
USPC ................. 726/23, 24; 713/188; 709/206
See application file for complete search history.

(56) References Cited

U.S. PATENT DOCUMENTS

| | | | |
|---|---|---|---|
| 8,046,751 B1 | 10/2011 | Avadhanula et al. | |
| 2007/0074188 A1* | 3/2007 | Huang | G06F 21/54 717/141 |
| 2007/0094734 A1* | 4/2007 | Mangione-Smith | G06F 21/564 726/24 |
| 2009/0013307 A1 | 1/2009 | Raghavan et al. | |
| 2010/0199264 A1* | 8/2010 | Maeda | G06F 11/3688 717/127 |
| 2010/0205674 A1 | 8/2010 | Zorn et al. | |
| 2010/0299656 A1* | 11/2010 | Shah | G06F 8/45 717/132 |
| 2011/0282949 A1* | 11/2011 | Rivkin | G06F 9/541 709/206 |
| 2012/0110557 A1* | 5/2012 | Singh | G06F 8/75 717/133 |
| 2012/0222019 A1* | 8/2012 | Gounares | G06F 9/44505 717/140 |
| 2012/0233584 A1* | 9/2012 | Ivancic | G06F 8/51 717/104 |
| 2013/0191918 A1* | 7/2013 | Nachenberg | H04W 12/12 726/24 |
| 2014/0007065 A1* | 1/2014 | Schmidt | G06F 8/4441 717/156 |

OTHER PUBLICATIONS

PCT International Search Report and Written Opinion in PCT International Application Serial No. PCT/US2013/066241 mailed on Jul. 10, 2014.

* cited by examiner

*Primary Examiner* — Joseph P Hirl
*Assistant Examiner* — Sayed Beheshti Shirazi
(74) *Attorney, Agent, or Firm* — Patent Capital Group

(57) ABSTRACT

A software sample is identified that includes code and a control flow graph is generated for each of a plurality of functions included in the sample. Features are identified in each of the functions that correspond to instances of a set of control flow fragment types. A feature set is generated for the sample from the identified features.

23 Claims, 9 Drawing Sheets

US 9,438,620 B2

CONTROL FLOW GRAPH REPRESENTATION AND CLASSIFICATION

TECHNICAL FIELD

This disclosure relates in general to the field of computer security and, more particularly, to malware detection and remediation.

BACKGROUND

The Internet has enabled interconnection of different computer networks all over the world. The ability to effectively protect and maintain stable computers and systems, however, presents a significant obstacle for component manufacturers, system designers, and network operators. Indeed, each day thousands of new threats, vulnerabilities, and malware are identified that have the potential of damaging and compromising the security of computer systems throughout the world. Antivirus, antispyware, and other antimalware products and solutions have been developed. Some traditional antimalware products employ a host-centric approach in which the bulk of the functionality of the antimalware tool is installed onto the host, with the antimalware tool occasionally downloading an update of remediation tools, virus definition files, and other content to keep the antimalware tool abreast of newly discovered malware and other developments. The antimalware tool can then screen objects, processes, downloads, and other events on the host machine to determine whether malware exists on the host, per the content received from the updater, as well as attempt to remediate the malware using functionality available at the host-based antimalware tool. The updater can catalog various malware and code that could potentially be malware and can use this information to provide content describing malware known to the updater.

BRIEF DESCRIPTION OF THE DRAWINGS

Like reference numbers and designations in the various drawings indicate like elements.

DETAILED DESCRIPTION OF EXAMPLE EMBODIMENTS

Figure 1:
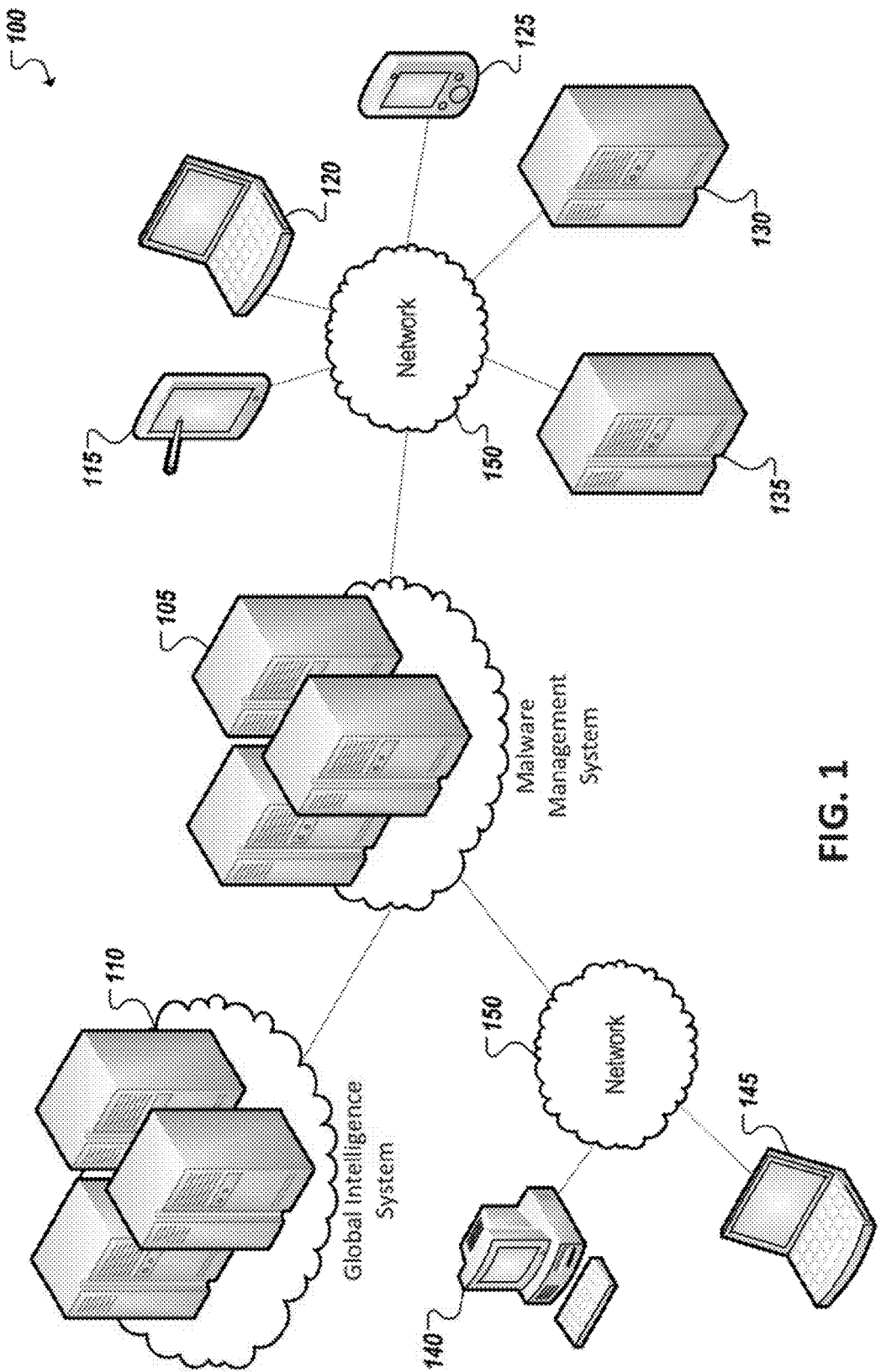
FIG. 1 is a simplified schematic diagram of an example system including an malware management system in accordance with one embodiment.

FIG. 1 is a simplified block diagram illustrating an example embodiment of a computing environment 100 including an example malware management system 105. The malware management system 105 can analyze samples comprising all or portions of various programs, scripts, applications, objects, and other computer-executable code. Various machine learning algorithms and other techniques can be used by the malware management system 105 to categorize and cluster samples received at or detected by the malware management system 105. Additionally, the malware management system 105 can assist in identifying features common or corresponding to various types of malware. Such analyses can form the bases for determining whether particular samples are or likely are malware, among other information.

Samples assessed by the malware management system 105 can be obtained from a variety of sources including a global intelligence system 110 that aggregates findings of multiple malware scanners and analysis tools. Sources of samples can also include security tools, including host-based tools, monitoring various host computing devices, including personal computing devices (e.g., 115, 120, 125), server systems (e.g., 130, 135) such as application, database, cloud, and other servers, among other examples. Findings of the malware management system 105 can be shared with other security tools, including host-based tools monitoring computing systems 115, 120, 125, 130, 135, among other examples. Such security tools can include, for instance, other antivirus and antimalware tools, host intrusion protection systems, network intrusion protection systems, web gateways, email gateways, intrusion detection systems, data-leak prevention systems, firewalls, whitelist/blacklist managers, and other host- and network-based security tools within multiple different domains. In some implementations, the malware management system 105 can serve as an updater, providing intelligence regarding patterns and features that correspond to malware classifications for various software code potentially intercepted by the host-based security tools and the like.

Additional computing devices (e.g., 140, 145) can also be provided in environment 100. For instance, user computing devices can be provided to interface with and administer malware management system 105. User computing devices 140, 145, as well as other computing systems (e.g., 110, 115, 120, 125, 130, 135) can interface with malware management system 105, and potentially also each other, using one or more networks 150. Networks 150, in some implementations, can include local and wide area networks, wireless and wireline networks, public and private networks, and any other communication network enabling communication between the systems.

In general, "servers," "devices," "computing devices," "host devices," "user devices," "clients," "servers," "computers," "systems," etc. (e.g., 105, 110, 115, 120, 125, 130, 135, 140, 145, etc.) can include electronic computing devices operable to receive, transmit, process, store, or manage data and information associated with the computing environment 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems.

Host and user devices (e.g., 115, 120, 125, 130, 135, 140, 145) can further computing devices implemented as one or more local and/or remote client or end user devices, such as personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Malware is in a constant state of development and evolution. One of the greatest challenges facing antimalware vendors and their systems is identifying new malware as early as possible and developing mechanisms for remediating the malware before its damage is widespread. This is particularly difficult given the awesome (and ever-expanding) volume and variety of malware variations. Further, submissions of malware samples for use in identifying characteristics of malware families, as well as new malware instances, are increasing in volume. For instance, in some systems, hundreds of thousands of samples maybe received for analysis each day. It may not be viable to perform human review for each such malware sample. Further, traditional computer-assisted techniques to assess and classify received samples have been prone to high rates of false positives and can scale poorly to the increasing load of samples that are to be handled.

Traditional classification techniques have been based on identifying dynamic behaviors of the program samples or the static features of the program samples. The behaviors or features identified for the sample can then be used to classify the sample. In the case of traditional behavior-based classification schemes, synthetic environments, or "sandboxes" are used to execute and extract the dynamic behaviors of the potential malware. However, executing the sample in a synthetic environment to assess the sample can be a time consuming operation. Further, some samples may be incompatible with and may not be executed in a synthetic environment. In the case of static features, or features that can be identified from the sample without executing the sample, traditional classification techniques have a tendency to yield high rates of false positives (e.g., false determinations that a sample is or is not malware). Further, many traditional static-feature-based classification schemes cannot be generalized to all families. For instance, traditional static properties that have been used to cluster samples and detect malware include such properties as imported library functions, file size, PE header information, among other examples.

Control flow graphs can be generated from an analysis of the static code of a sample program. Control flow graphs can represent, using graph notation, all of paths that might be traversed through a sample during its execution. Accordingly, a control flow graph can represent a static feature of the sample that at least partially represents the behavior (e.g., potential flows) of the sample. Graph similarity algorithms, such as graph isomorphism algorithms, can be theoretically used to compare control flow graphs of various samples, for instance, to cluster and classify samples based on their respective control flow graphs. However, graph isomorphism and other graph comparison algorithms can also have high performance overhead making it difficult for such algorithms to scale to handle current rates of new samples.

An improved malware management system can be provided, such as illustrated and described herein, that can generate a static feature set based on control flow graphs of samples received for assessment and classification. The feature set can represent select portions of the control flow graph of the sample and can be used in connection with a variety known machine learning techniques (e.g., K-mean, SVM, etc.) for classification of the sample. As the feature set describes behavioral aspects of the sample, the feature set can present high quality features for use in successfully classifying samples with relatively low false positive rates. Additionally, such feature sets can be classification algorithm agnostic and compatible across multiple technologies, among other example advantages and uses. For instance, classifying samples based on the improved feature set can be achieved with low overhead, allowing scaling for high throughput to enable increased detection rate, among other examples.

Figure 2:
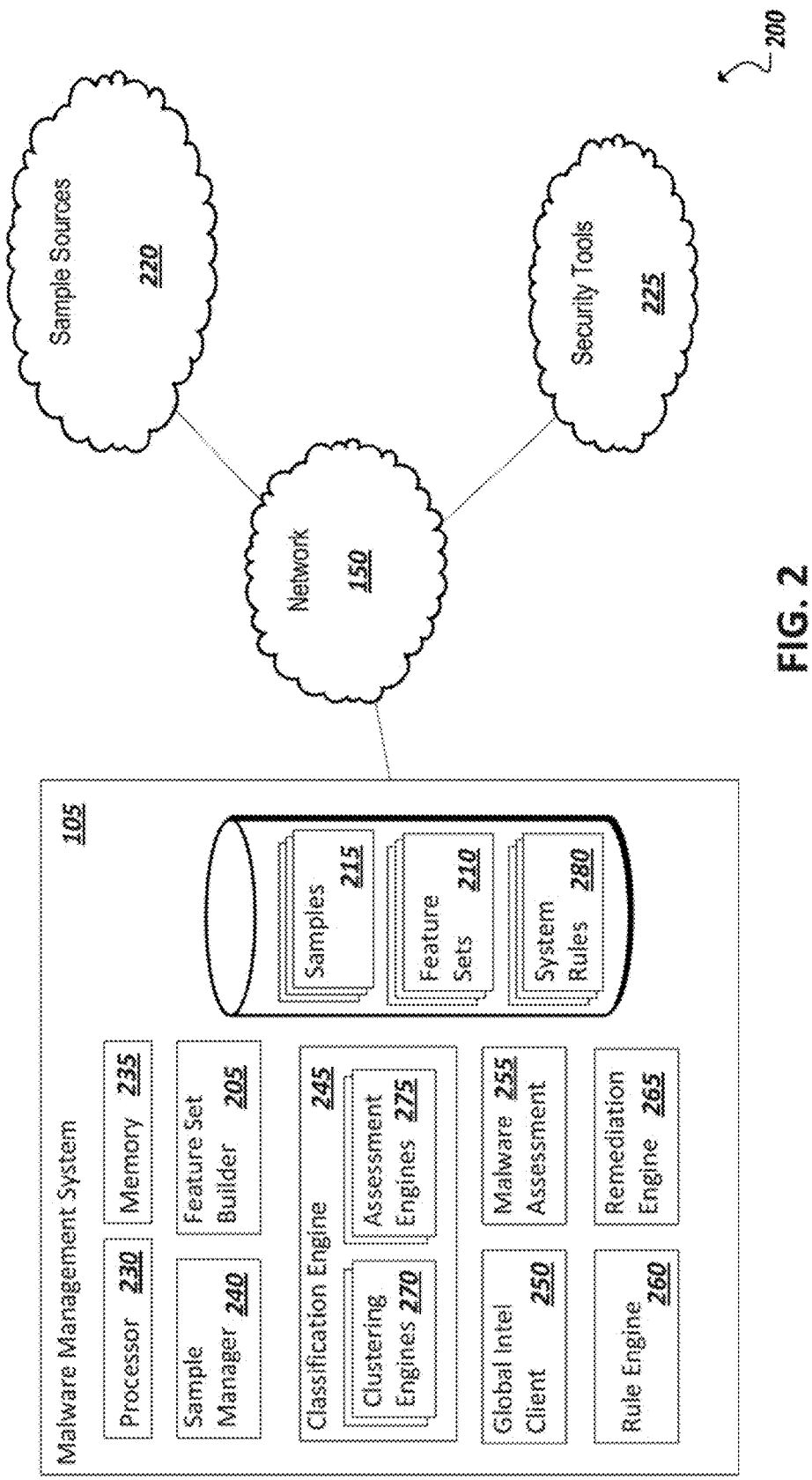
FIG. 2 is a simplified block diagram of an example system including an example feature set builder in accordance with one embodiment.

Systems and tools can be provided, configured to generate and used an improved feature set for program samples that provide these and other benefits and resolve many of the above-described issues in traditional malware classification solutions. For instance, as shown in the example of FIG. 2, a simplified block diagram 200 is shown illustrating a system or computing environment that includes, for instance, an example malware management system 205 or other subsystem that includes a feature set builder 205 capable of generating improved feature sets (e.g., 210) from samples (e.g., 215). A system can further include one or more sources 220 of samples as well as security tools 225 that can use information and classifications developed by malware management system 205 for scanning, filtering, blocking, and remediating malware and other threats.

In one example, malware management system 105 can include one or more processor devices 230, one or more memory elements 235, and other components implemented in hardware and/or software, including feature set builder 205, sample manager 240, classification engine 245, global intelligence client 250, malware assessment engine 255, rule engine 260, and remediation engine 265, among other potential components. A sample manager 240 can manage the intake of program samples 215 from a variety of different sources 220. Sample manager 240 can further determine whether information regarding a sample has already been obtained, and whether the sample has already been assessed or otherwise catalogued by the malware management system 105. The sample manager 240 can further identify that an improved feature set 210, such as one based on a control flow graph of the sample 215, is to be generated.

Feature set builder 205 can include hardware- and software-based logic for generating feature sets 210 from samples 215. Turning briefly to the examples of FIG. 3, a simplified block diagram 300 is shown illustrating one or more sample sources 220 that can provide a variety of samples 215*a-c* including all or portions of the code of various software programs, scripts, objects, and the like, to a feature set builder 205. The samples 215*a-c* can be provided with the expectation that the samples 215*a-c* are to be classified or used to classify other samples as likely being malware or not. Each sample 215*a-c* can be provided to feature set builder 205 which can disassemble the code and generate control flow graphs for each sample 215*a-c*. The control flow graphs can then be abstracted to generate corresponding features sets 210*a-c* that describe particular features of the respective sample 215*a-c* represented in the samples 215*a-c*, including the function calls, API calls, memory accesses, and other behavioral (and quasi-behavioral) features of the sample represented in the control flow graphs. These improved features sets 210*a-c* can then be provided to a classification engine 245, which can apply one or more algorithms to classify the samples 215*a-c* according to the features represented in feature sets 210*a-c*. These classifications can be used to identify correlations between the samples and known malware or malicious operations, among other examples.

Figure 3:
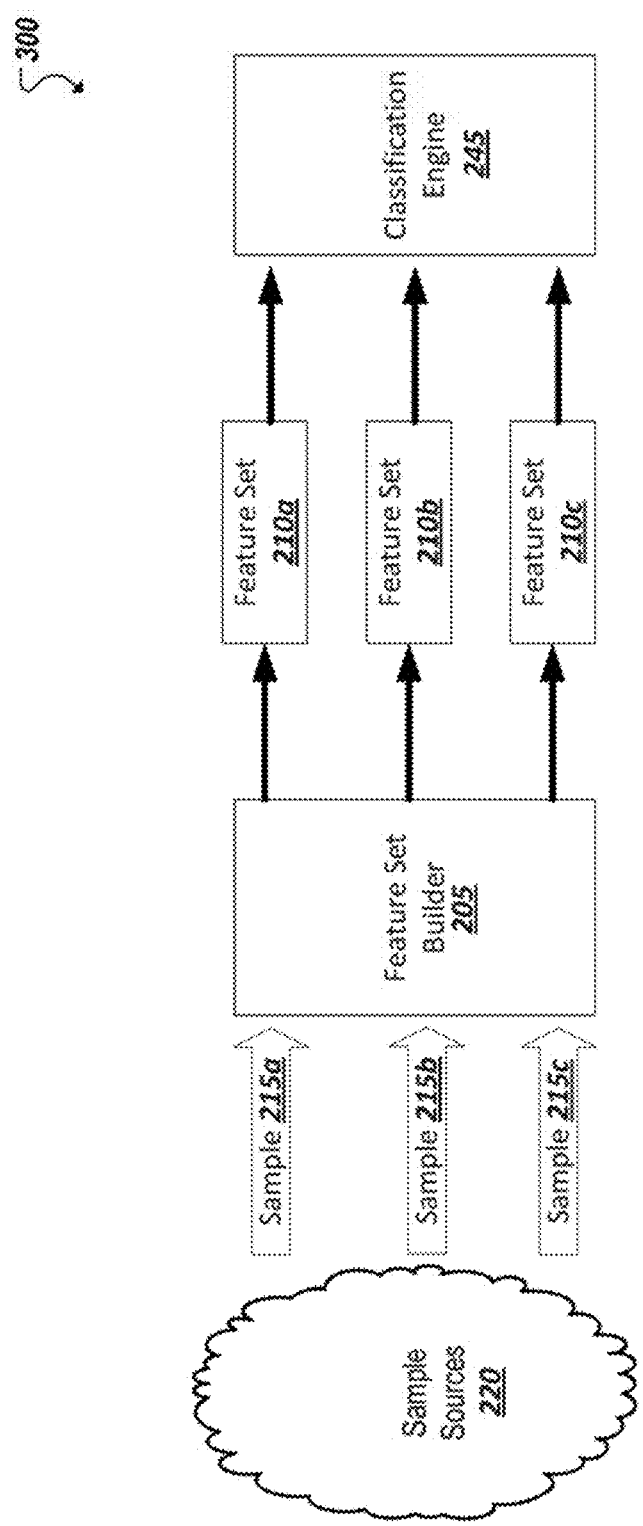
FIG. 3 is a simplified block diagram representing generation of example features sets for each of a plurality of samples in accordance with one embodiment.

Returning to the discussion of FIG. 2, in some instances, such as that described in the example of FIG. 3, feature set builder 205 can include a disassembler to disassemble the sample into disassembled code that can be provided to a control flow graph generator of the feature set builder 205. The control flow graph generator can generate a control flow graph for each sample and an abstractor can filter those nodes of the control flow graph that pertain to features that have been predefined as being of lesser interest to classification algorithms (e.g., implemented at 245) to "trim" the control flow graph to include those sequences and flows relating to pre-defined types of behavioral features that are to be charted in the control flow graph and described in the resulting feature sets 210. For instance, in some implementations, control flow nodes and branches relating to memory access sequences, function calls, and API calls can be targeted as the features of interest and the abstractor logic of the feature set builder 205 can trim other nodes of the control flow graph not relating to these targeted features. In some cases, multiple control flow graphs can be generated for a single sample. For example, each function of a sample may have a separate control flow graph generated for it. The separate control flow graphs, or abstracted control flow graphs, can be aggregated, for instance, using aggregation logic, and a feature set (e.g., 210) can be generated from the aggregate control flow graph information to describes the entirety of the features of interest of the sample. The resulting feature set can serve as a "genetic map" or "fingerprint" of the sample to identify features of the sample, for instance, to machine learning systems or other tools that can be used, for instance, in classification engine 245, to classify, cluster, or otherwise assess the samples 215 received by the malware management system 105.

Figure 4:
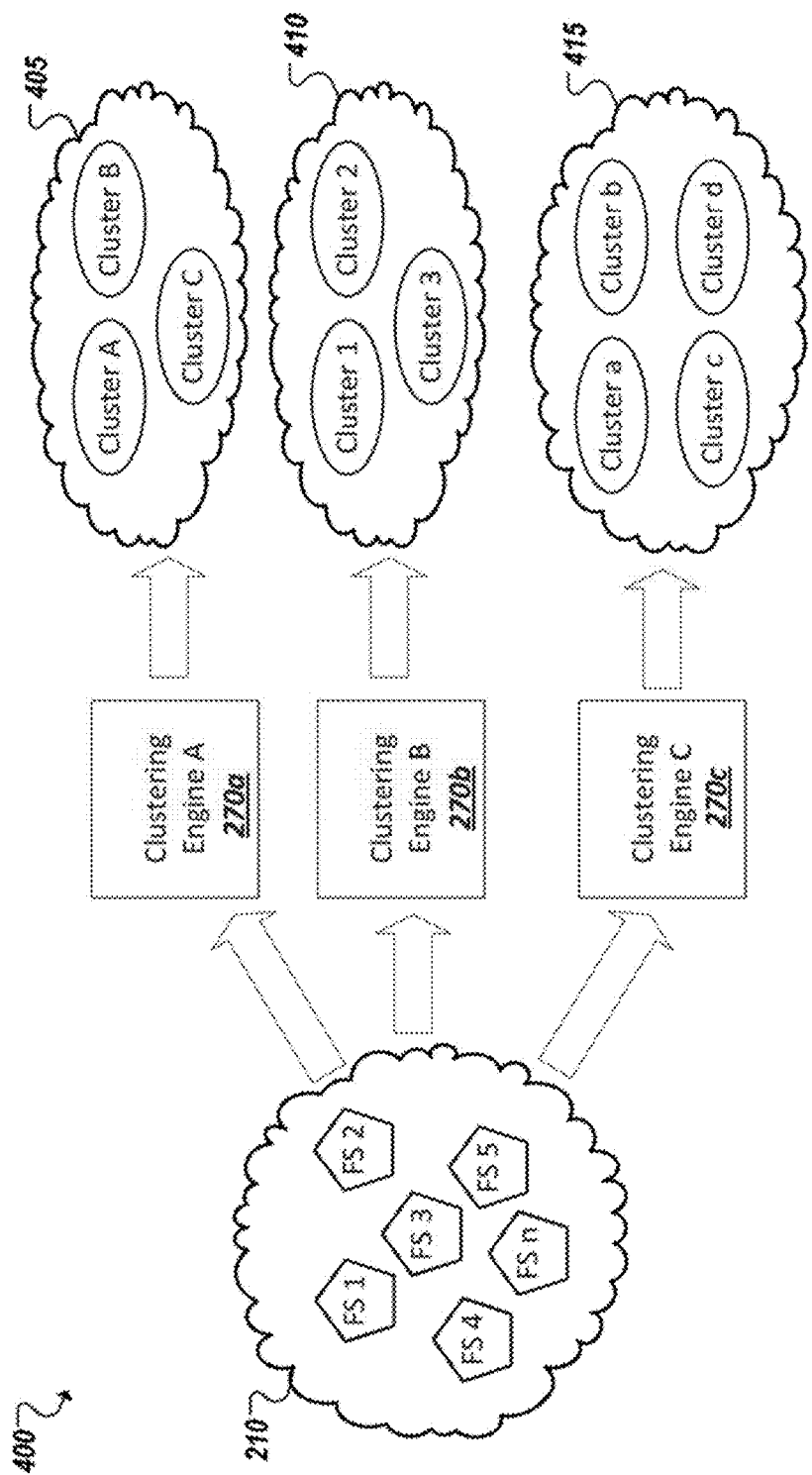
FIG. 4 is a simplified block diagram representing using feature sets to classify corresponding samples in accordance with one embodiment.

In some instances, one or more example classification engines (e.g., 245) can be provided that can utilize feature sets 210 to assess and classify samples 215. In some implementations, a classification engine 245 can employ multiple different algorithms, including machine learning algorithms, to assess features sets 210 in varied ways. Different insights into the samples 215 can be obtained by employing multiple clustering engines 270 and assessment engines 275 employing such algorithms. Turning briefly to FIG. 4, a simplified block diagram 400 is shown illustrating clustering engines 270*a-c* employing different machine learning algorithms to identify correlations and commonalities between feature sets 210, each feature set (e.g., FS1, FS2, etc.) corresponding to a control flow graphs of a respective sample. As shown in the example of FIG. 4, each clustering algorithm can group samples into clusters (e.g., Cluster A, B, C, 1, 2, 3, a, b, c, etc.) based on the algorithm employed. For instance, clustering engine 270*a* can cluster samples into a set of cluster 405, while clustering engines 270*b*, 270*c* cluster the same group of samples differently and into different sets 410, 415 of clusters.

Relationships between various samples can be derived based on the clusters (e.g., in 405, 410, 415), including relationships based on certain features or groups of features. These clusters can be determined to correlate with malware or particular families of malware, among other (non-malicious) types of samples, among other examples. For instance, returning to the example of FIG. 2, assessment engines 275 can be provided that can analyze clusters generated by clustering engines 270 to determine how to classify samples, or samples having certain core features, as malware or not. For instance, based on common groupings of features identified in a cluster of samples that has been determined or predicted to correspond to a particular family of malware, future samples that have been identified (e.g., from their corresponding feature set) to include the same or similar groupings of features can be determined (e.g., by assessment engine 275) that these future samples also likely correspond to the particular family of malware. Accordingly, assessment engines 275 can not only predict or determine whether a given sample is malware but can also determine which family or type of malware the sample corresponds to.

In some implementations, malware management system 105 can make use of information served by one or more global intelligence systems that aggregate intelligence derived from a variety of different source, such as security tools 225. For instance, malware management system 105 can identify families of malware, including new families, and can further obtain samples indicative of these families that can be used, for instance, by classification engine 275. Accordingly, in some implementations, malware management system 105 can include a global intelligence client 250 that interfaces with and consumes global intelligence data from one or more global intelligence systems 225. Rules (e.g., 280) can also be generated from global intelligence provided by a global intelligence system, among other examples.

Malware management system 105 can further include components such as a malware assessment engine 255, rule engine 260, and remediation engine 265. Malware assessment engine 255 can further assess samples that have been identified as malware (e.g., by classification engine 245) to glean additional information about the character of malware, as well as individual samples classified as potentially being malware. A remediation engine 265 can further provide information, for instance, to security tools 225, based on information discovered through classification engine 245, global intelligence systems (through client 250), and malware assessment engine 255, etc., to update and provide guidance to security tools 225 regarding remediation of malware identified using information derived using malware management system 105. Rule engine 260 can access and generate rules 280 for use in tailoring remediation of malware to various security tools and other clients of malware management system 105. Further, rules 280 can be used as the basis for determining how certain samples are characterized or identified to various clients. For instance, certain families of malware may not be relevant to certain systems or security tools that monitor these systems, accordingly, such malware may not be reported to theses security tools, among many other examples, as well as implementations of malware management system 105 and its various components.

Figure 5A:
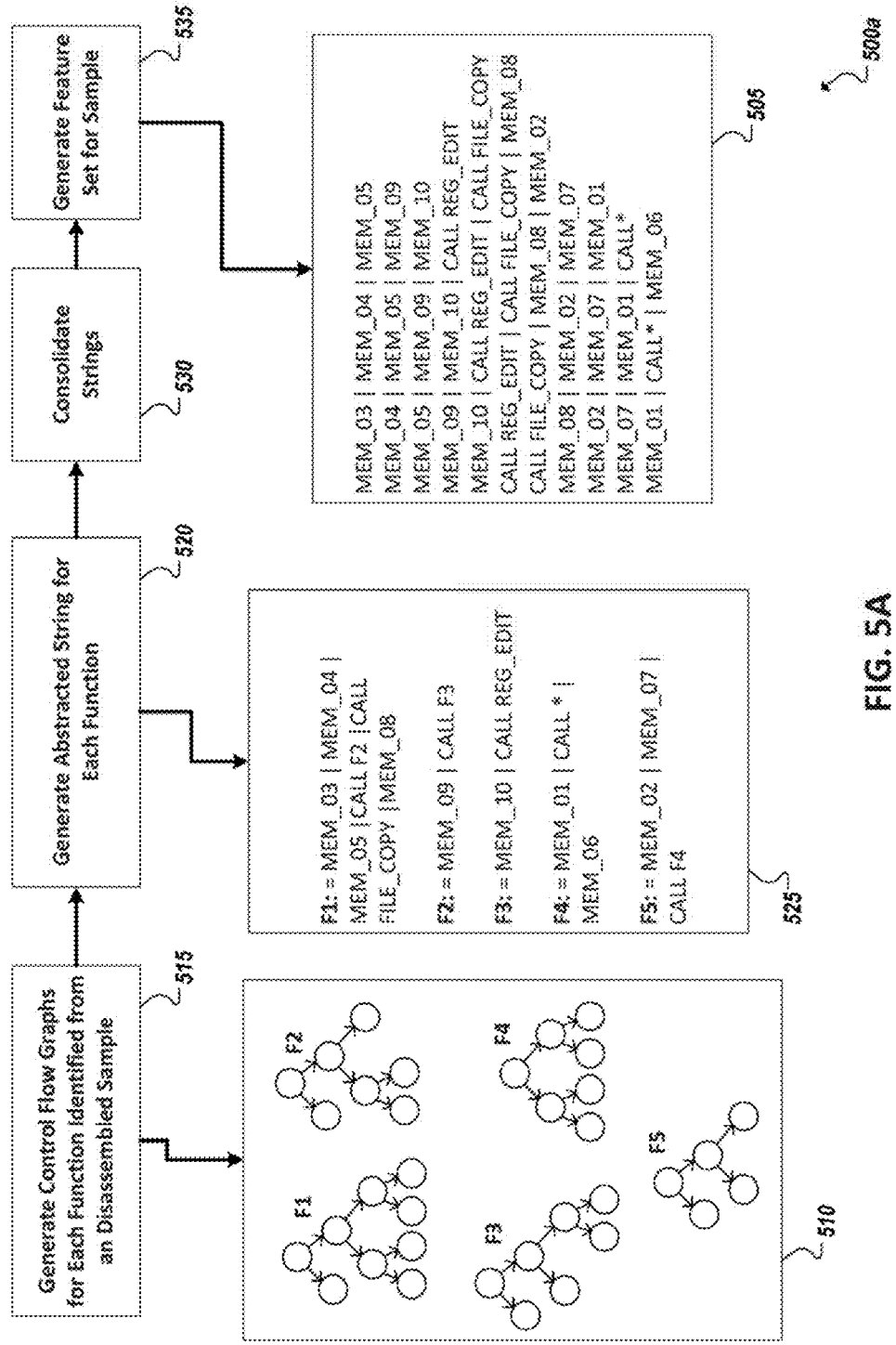
FIGS. 5A-5B are simplified block diagrams representing example generation of an example feature set from a sample in accordance with one embodiment.
Figure 5B:
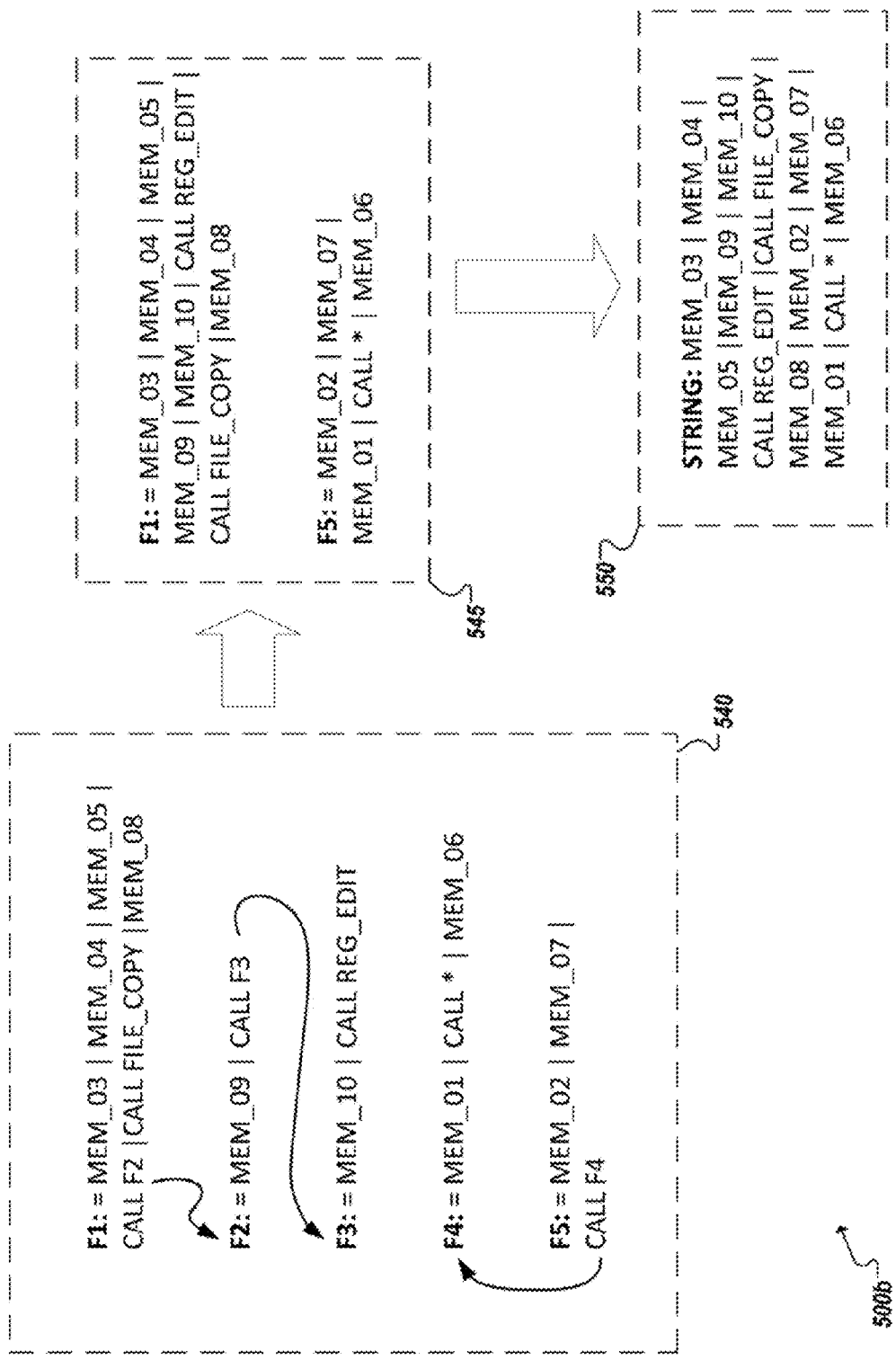

Turning to the examples of FIGS. 5A-5B, simplified block diagrams 500a-b are shown illustrating a particular implementation of the form and generation of an example feature set 505. In this particular example, feature set 505 can be generated for a sample and can be implemented as an n-gram of an abstracted set of features from control flow graphs (e.g., 510) generated (at 515) for the sample. The code of the sample can be disassembled and the control flow graphs 510 can be generated from the disassembled code. In some cases, separate control flow graphs 510 are generated for each function included in the sample code (e.g., functions F1, F2, F3, F4, F5). The control flow graphs 510 can be analyzed and a corresponding string can be generated that represents the control flow graph of each respective function. In the present example, an abstracted string can be generated such that nodes and branches of the control flow graphs representing pre-defined particular types of sequences or actions in a function are removed, or trimmed, from the representation of the control flow graph in the abstracted string. In implementations, such as that described in connection with FIGS. 5A-5B, the abstracted string is to be limited to identifying known and unknown function calls (including API function calls) and memory accesses by the function. All other nodes and actions of the function (such as register calls) can be abstracted away (i.e., removed) from the representation of the function's behavior.

In one example, abstracted strings 525 can be generated for each function. For instance, function F1 can include memory accesses MEM_03, MEM_04, MEM_05, a call to function F2 (CALL F2), a call to an API function FILE_COPY, and another memory access MEM_08. The order in which the features (e.g., individual memory accesses and function calls) are listed in the strings can be defined by the structure of the corresponding control flow diagrams (e.g., control flow diagram F1) upon which the strings are based. For instance, the control flow graphs can be read (e.g., by abstraction logic and/or string building logic) according to a predefined common pattern that is to be followed for every generated control flow graph. For instance, a string can be generated by identifying each node in an order beginning at the root node of the control flow graph and then flowing downward from left to right among sister nodes, among other example patterns. In some implementations, the string can be generated from an abstracted control flow graph, where the features of lesser interest are trimmed from the control flow graph prior to generating a string for the control flow graph. In other implementations, a string can be generated for the entire control flow graph of a function and the string itself can be parsed and abstracted to remove those features of lesser interest, such that higher value features (e.g., memory accesses and function call features) are the only features remaining in the abstracted string.

Continuing with the example of FIG. 5A, multiple abstracted strings 525 can be generated for each function identified in a sample. The abstracted strings can identify the various memory access and function call features of a sample on a function-by-function bases, including API function calls (e.g., CALL REG_EDIT, CALL FILE_COPY, etc.), other known function calls (e.g., calls to others functions in the sample (e.g., CALL F2, CALL F3, etc.), as well as unknown function calls, or calls not recognized by the feature set engine. Unknown function calls can be identified by a generic identifier (e.g., CALL *) or an identifier that attempts to somehow characterize the unrecognized function call, among other examples. To generate a feature set that is descriptive of the entirety of the sample, and not just merely its various functions, the strings can be consolidated 530 to generate a single string for the entire sample.

Turning to the example of FIG. 5B, in some implementations, consolidation of multiple strings describing individual control flow graphs of the composite functions of a sample can take place by identifying opportunities to consolidate the strings. For instance, a function call that calls any of the other functions in the sample can result in the string for that called function being consolidated within the string of the calling function, as illustrated in box 540. For instance, function F1 calls function F2 and function F2 calls function F3. Accordingly, as shown in box 545, "CALL F2" in the string for function F1 can be replaced with the contents of the string for function F2 (i.e., "MEM_09|CALL F3"). Likewise, "CALL F3" can be replaced with the contents of the string for function F3 (i.e., "MEM_10|CALL REG_EDIT").

In some cases, replacing string features for calls to other functions, with the strings for those called functions can result in the generation of a single consolidated string for the sample. However, in other instances, such as the example of FIG. 5B, two top-level functions can be identified (i.e., that are not called directly by any of the other functions in the sample), functions F1 and F5. In this example, a separate consolidated string (in 545) can be generated for each top level function that incorporates the strings of the called, lower level functions (e.g., F2, F3, F4). The two remaining strings corresponding to functions F1 and F5 can be concatenated (e.g., at 550) to form a single consolidated string for the sample. The order of the concatenating can be pre-defined, such as, based on where the respective top-level functions are represented in the control flow graph, among other examples. The order of concatenating, like the pattern for generating strings from the control flow graphs, can be according to a common, pre-defined scheme, such that the result (e.g., at 550) is repeatable for like samples.

A consolidated feature string 550 generated for a sample can include identification of each of the targeted feature types described in the control flow graph(s) of the sample. In some implementations, the consolidated string 550 can embody the feature set that is to be provided for analysis by classification engines utilizing one or more classification algorithms. In other implementations, the consolidated string 550 can be further processed to generate a feature set for the sample. For instance, the consolidated string can be reformatted such that the structure of the feature set is better adapted to be consumed and analyzed by various classification engines and associated algorithms. In one implementation, illustrated for instance in the example of FIG. 5A, the consolidated string 550 can be converted into an n-gram (in this particular case a 3-gram), such as illustrated by feature set 505. Other implementations of a feature set can be adopted and generated from a consolidated string 500 or other structure summarizing an abstraction of a control flow diagram of a sample, including implementations that utilize different sized n-grams (e.g., bigrams, four-grams, etc.), different structures (e.g., n-tuples, re-formatted string, etc.), and other embodiments adapted for use as inputs to machine learning, data clustering and classification algorithms, among other examples.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 6:
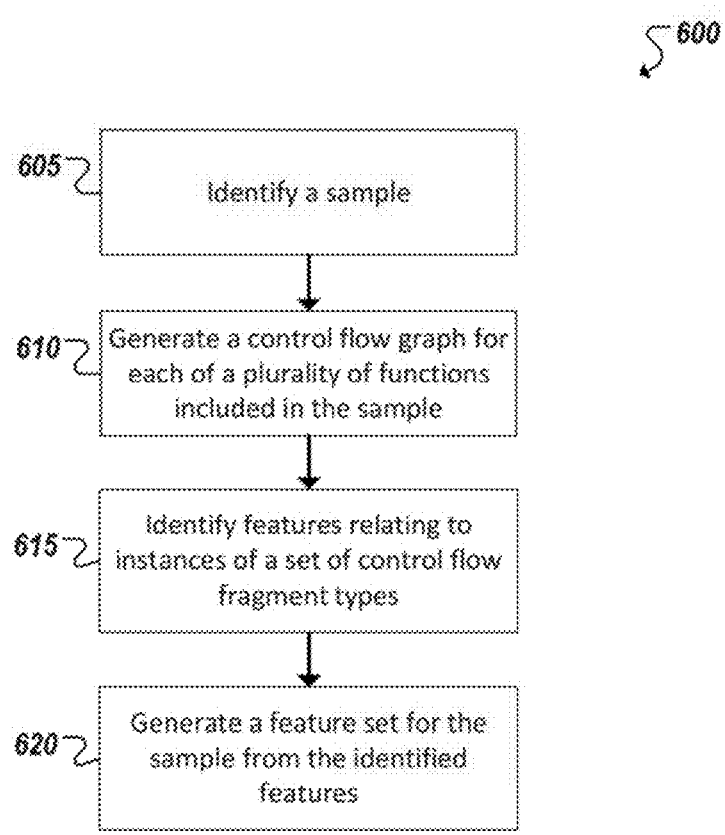
FIG. 6 is a flowchart representing example operations of an example feature set builder in accordance with one embodiment.

FIG. 6 is a simplified flowchart 600 illustrating example techniques involving an example malware management system. For example, in the example of FIG. 6, a particular sample can be identified 605 that includes all or a portion of the code of a particular software program or script. The sample can be processed (e.g., disassembled) and a control flow graph for each function included in the sample code of the sample can be generated 610. Features of the sample can be identified 615 from the control flow graphs. The features that are to be identified 615 can correspond to instances of a set of control flow fragment types. Control flow fragments can be actions identified in the control flow graphs, such as memory accesses, API function calls, calls to other functions of the sample, registry calls, etc. A subset of the control flow fragment types can be targeted and instances of this subset can be identified as features of the sample. The sets of features identified 615 for the functions can be combined to assemble, for instance, a consolidated string identifying each feature identified 615 for the sample. Accordingly, a feature set can be generated 620 from the control flow graphs and correspond to the features identified 615 from the control flow graphs. Such feature sets can be adapted as inputs to machine learning, classification, and other algorithms for assessing the samples, including algorithms that can be used to cluster samples and identify whether the samples are malware or not, among other examples.

Figure 8:
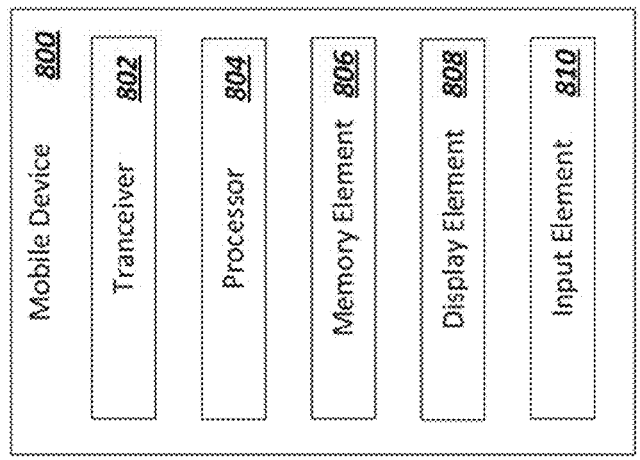
FIG. 8 is a block diagram of an exemplary mobile device system in accordance with one embodiment.
Figure 7:
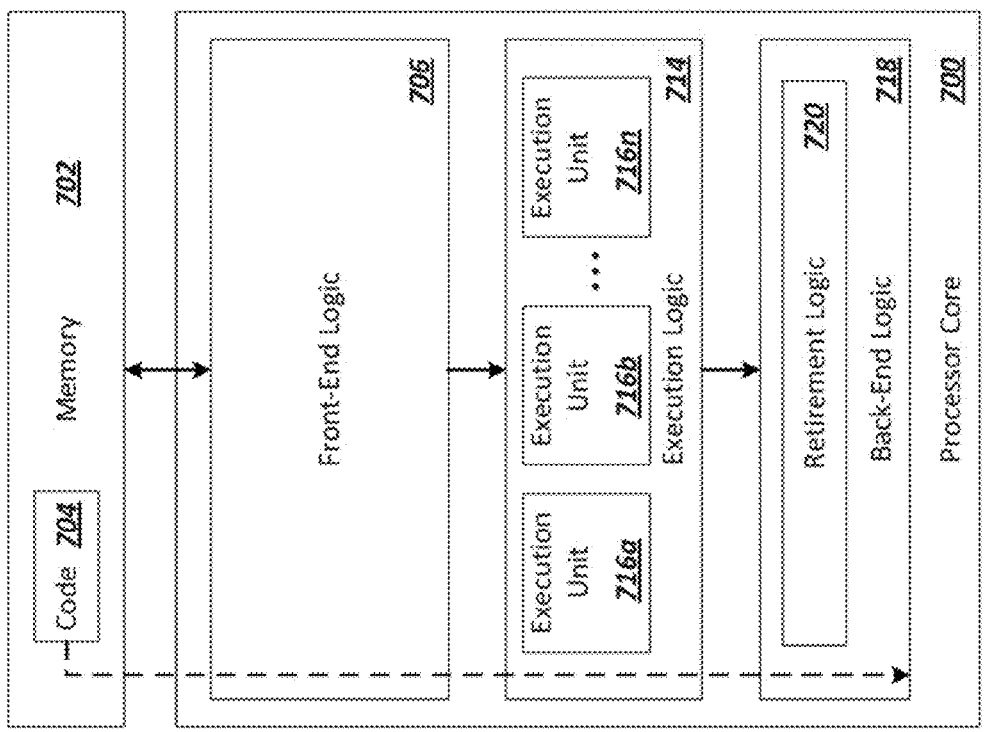
FIG. 7 is a block is a block diagram of an exemplary processor in accordance with one embodiment.
Figure 9:
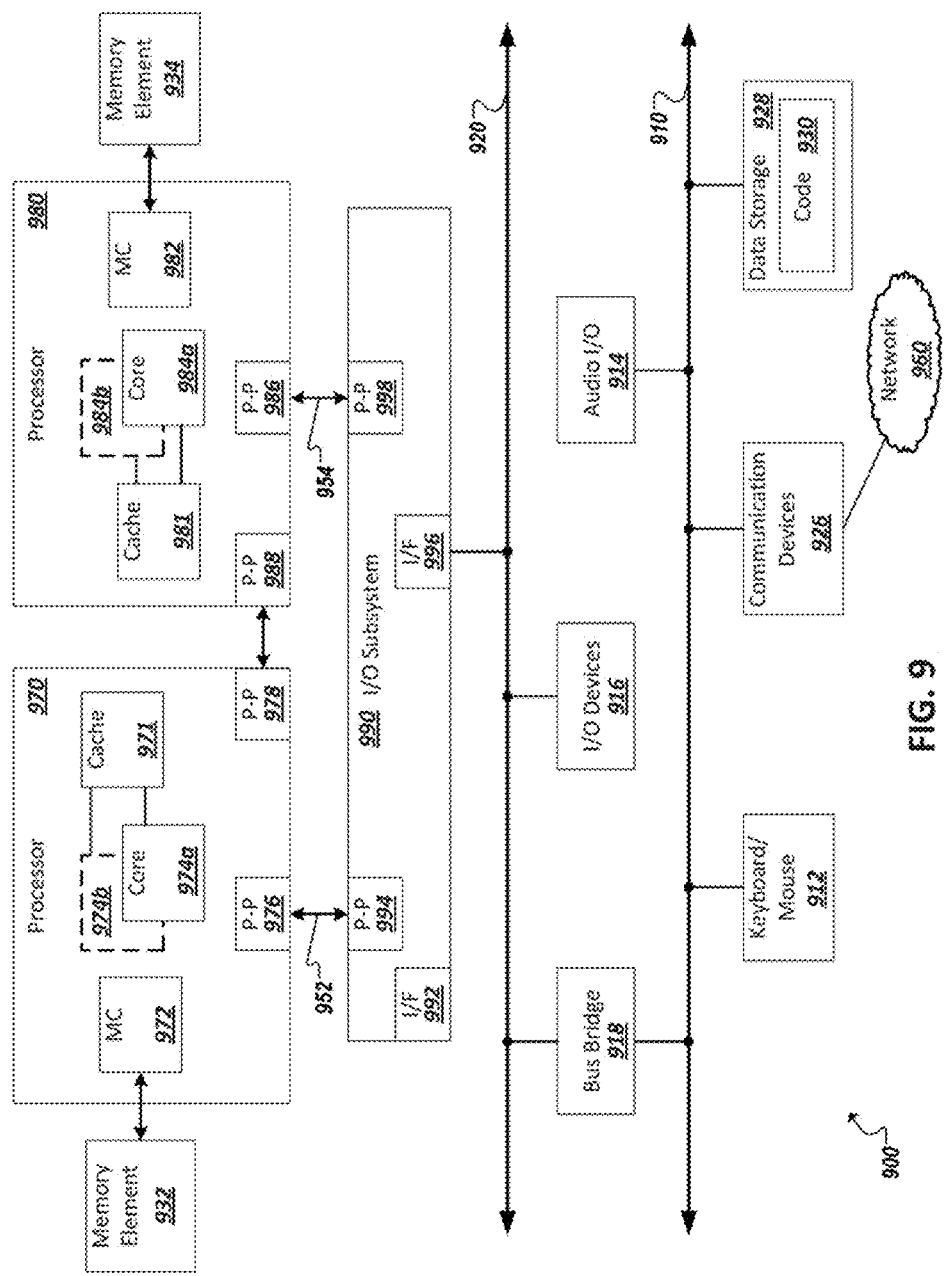
FIG. 9 is a block diagram of an exemplary computing system in accordance with one embodiment.

FIGS. 7-9 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 7-9.

FIG. 7 is an example illustration of a processor according to an embodiment. Processor 700 is an example of a type of hardware device that can be used in connection with the implementations above.

Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716a, 716b, 716n, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

Referring now to FIG. 8, a block diagram is illustrated of an example mobile device 800. Mobile device 800 is an example of a possible computing system (e.g., a host or endpoint device) of the examples and implementations described herein. In an embodiment, mobile device 800 operates as a transmitter and a receiver of wireless communications signals. Specifically, in one example, mobile device 800 may be capable of both transmitting and receiving cellular network voice and data mobile services. Mobile services include such functionality as full Internet access, downloadable and streaming video content, as well as voice telephone communications.

Mobile device 800 may correspond to a conventional wireless or cellular portable telephone, such as a handset that is capable of receiving "3G", or "third generation" cellular services. In another example, mobile device 800 may be capable of transmitting and receiving "4G" mobile services as well, or any other mobile service.

Examples of devices that can correspond to mobile device 800 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 800 illustrated in FIG. 8 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 800 includes a transceiver 802, which is connected to and in communication with an antenna. Transceiver 802 may be a radio frequency transceiver. Also, wireless signals may be transmitted and received via transceiver 802. Transceiver 802 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 802 is connected to a processor 804, which may perform the bulk of the digital signal processing of signals to be communicated and signals received, at the baseband frequency. Processor 804 can provide a graphics interface to a display element 808, for the display of text, graphics, and video to a user, as well as an input element 810 for accepting inputs from users, such as a touchpad, keypad, roller mouse, and other examples. Processor 804 may include an embodiment such as shown and described with reference to processor 700 of FIG. 7.

In an aspect of this disclosure, processor 804 may be a processor that can execute any type of instructions to achieve the functionality and operations as detailed herein. Processor 804 may also be coupled to a memory element 806 for storing information and data used in operations performed using the processor 804. Additional details of an example processor 804 and memory element 806 are subsequently described herein. In an example embodiment, mobile device 800 may be designed with a system-on-a-chip (SoC) architecture, which integrates many or all components of the mobile device into a single chip, in at least some embodiments.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the computing systems described herein may be configured in the same or similar manner as computing system 900.

Processors 970 and 980 may also each include integrated memory controller logic (MC) 972 and 982 to communicate with memory elements 932 and 934. In alternative embodiments, memory controller logic 972 and 982 may be discrete logic separate from processors 970 and 980. Memory elements 932 and/or 934 may store various data to be used by processors 970 and 980 in achieving operations and functionality outlined herein.

Processors 970 and 980 may be any type of processor, such as those discussed in connection with other figures. Processors 970 and 980 may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a keyboard/mouse 912 (or other input devices such as a touch screen, trackball, etc.), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
   identify a particular sample comprising code;
   generate a structure to represent the particular sample, wherein the structure represents a plurality of functions included in the particular sample;
   identify, in each of the functions, respective control flow fragments of the function;
   identify a subset of the fragments of the plurality of functions as features of the particular sample based on each of the subset of fragments comprising an instance of a respective one of a predefined set of fragment types;
   generate a feature set for the particular sample from the identified features; and
   classify the particular sample based on a determination that feature sets of a cluster of other samples overlap with the feature set of the particular sample.

2. The storage medium of claim 1, wherein the instructions, when executed, are to further cause the machine to combine the features identified for each of the functions to generate a consolidated string for the particular sample, wherein the feature set is generated from the consolidated string.

3. The storage medium of claim 2, wherein the instructions, when executed, are to further cause the machine to generate, for each of the functions, a string describing the respective features identified for the function.

4. The storage medium of claim 3, wherein combining the features includes:
   identifying a call in a particular one of the plurality of functions to another one of the plurality of functions; and
   replacing a portion of the string of the particular function referencing the other function with contents of the string of the other function.

5. The storage medium of claim 3, wherein identifying the features includes abstracting each of the strings of the functions such that only features of the set of fragment types are described in the strings and fragments of the functions of types outside the set of fragment types are excluded from the feature set.

6. The storage medium of claim 1, wherein the set of fragment types comprise memory accesses by the function and function calls by the function.

7. The storage medium of claim 5, wherein identifying the features comprises:
identifying instances of memory accesses by each of the functions; and
identifying instances of function calls by each of the functions.

8. The storage medium of claim 1, wherein the feature set identifies each of the features identified for each of the functions.

9. The storage medium of claim 1, wherein the feature set comprises an n-graph.

10. The storage medium of claim 1, wherein classifying the particular sample includes determining a set of features relevant to a cluster of samples.

11. The storage medium of claim 1, wherein classifying the particular sample includes determining whether to classify the sample as malware.

12. The storage medium of claim 1, wherein classifying the particular sample includes determining whether the sample is likely one of one or more families of malware.

13. The storage medium of claim 1, wherein identifying the features includes abstracting each of the structures such that only features of the set of control flow fragment types are described in the structures.

14. A method comprising:
identifying a particular sample comprising code;
generating, using at least one data processing apparatus, a structure for the particular sample, wherein the structure represents a plurality of functions included in the particular sample;
identifying, using at least one data processing apparatus, in each of the functions, respective fragments of the function;
identify a subset of the fragments of the plurality of functions as features of the particular sample based on each of the subset of fragments comprising an instance of a respective one of a predefined set of fragment types;
generating, using at least one data processing apparatus, a feature set for the particular sample from the identified features; and
classifying the particular sample based on a determination that feature sets of a cluster of other samples overlap with the feature set of the particular sample.

15. The method of claim 14, further comprising combining the features identified for each of the functions to generate a consolidated string for the particular sample, wherein the feature set is generated from the consolidated string.

16. The method of claim 15, further comprising generating, for each of the functions, a string describing the respective features identified for the function.

17. The method of claim 16, wherein combining the features includes:
identifying a call in a particular one of the plurality of functions to another one of the plurality of functions; and
replacing a portion of the string of the particular function referencing the other function with contents of the string of the other function.

18. The method of claim 14, further comprising receiving a plurality of samples including the particular sample.

19. The method of claim 18, wherein the plurality of samples are received from a plurality of sources.

20. A system comprising:
at least one processor device;
at least one memory element; and
a feature set builder, when executed by the at least one processor device, to:
identify a particular sample comprising code;
generate a structure for the particular sample, wherein the structure represents a plurality of functions included in the particular sample;
identify, in each of the functions, respective fragments of the function;
identify a subset of the fragments of the plurality of functions as features of the particular sample based on each of the subset of fragments comprising an instance of a respective one of a predefined set of fragment types;
generate a feature set for the particular sample from the identified subset of the fragments; and
classify the particular sample based on a determination that feature sets of a cluster of other samples overlap with the feature set of the particular sample.

21. The system of claim 20, wherein the cluster comprises a particular one of a plurality of clusters.

22. The system of claim 20, wherein the feature set identifies a subset of features identified in the structures of the functions of the particular sample.

23. The system of claim 22, wherein the subset of features corresponds to memory accesses and function calls in the sample code.

* * * * *

UNITED STATES PATENT AND TRADEMARK OFFICE
CERTIFICATE OF CORRECTION

PATENT NO. : 9,438,620 B2  
APPLICATION NO. : 14/126872  
DATED : September 6, 2016  
INVENTOR(S) : Erdem Aktas et al.

Page 1 of 1

It is certified that error appears in the above-identified patent and that said Letters Patent is hereby corrected as shown below:

In the Drawings

On sheet 8 of 9, in FIG. 8, reference numeral 802, Line 1, Delete "Tranceiver" and insert -- Transceiver -- therefor.

In the Claims

In Column 14, Line 35, in Claim 1, after "respective" delete "control flow".

In Column 15, Line 29, in Claim 13, after "set of" delete "control flow".

Signed and Sealed this  
Twenty-seventh Day of March, 2018

Andrei Iancu  
*Director of the United States Patent and Trademark Office*